No. 645,751. Patented Mar. 20, 1900.
J. E. LEWIS.
APPARATUS FOR PURIFYING SEWERS.
(Application filed Apr. 10, 1899.)
(No Model.)
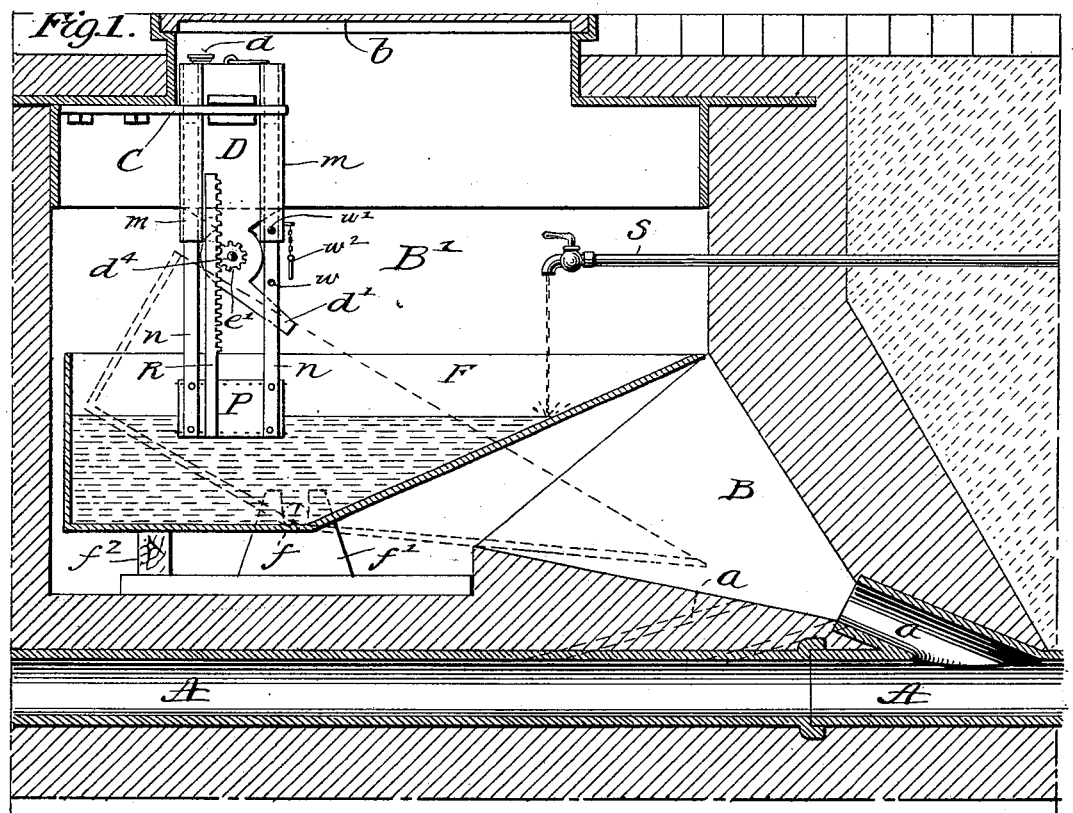
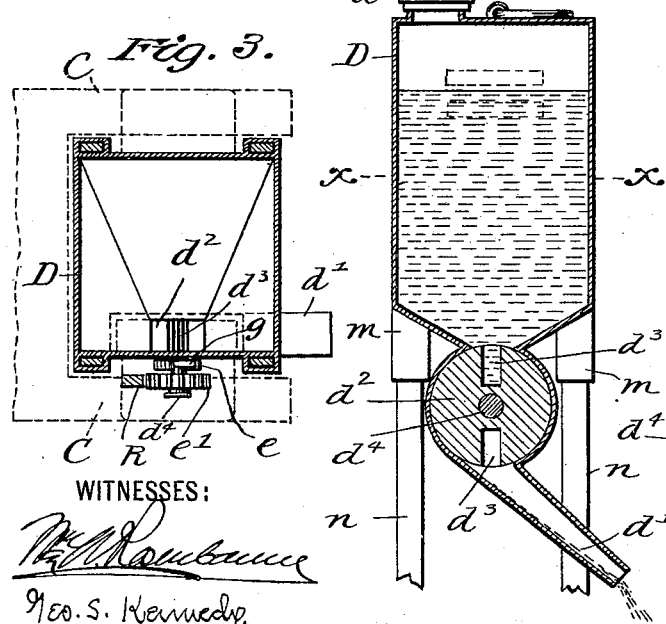
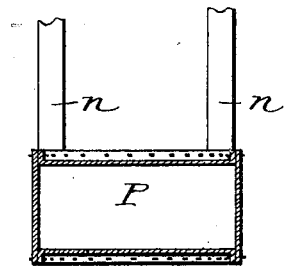
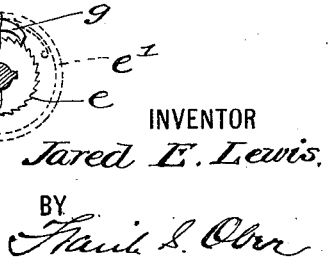
WITNESSES:
INVENTOR
Jared E. Lewis.
BY
ATTORNEY

UNITED STATES PATENT OFFICE.

JARED E. LEWIS, OF PHILADELPHIA, PENNSYLVANIA.

APPARATUS FOR PURIFYING SEWERS.

SPECIFICATION forming part of Letters Patent No. 645,751, dated March 20, 1900.

Application filed April 10, 1899. Serial No. 712,572. (No model.)

*To all whom it may concern:*

Be it known that I, JARED E. LEWIS, a citizen of the United States, residing at Philadelphia, in the county of Philadelphia and State of Pennsylvania, have invented certain new and useful Improvements in Apparatus for Purifying Sewers, of which the following is a full, clear, and exact description.

This invention relates to sewer sanitation, the object being to provide means whereby sewers or drains of any character may be automatically supplied with a suitable disinfectant at regular intervals and an even distribution of the same over a considerable area of the sewer or drain effectually accomplished.

In carrying out my invention I employ a vessel containing a suitable disinfectant in dry or liquid form in combination with a tank or reservoir of relatively-large capacity connected with a suitable source of water-supply, the former being adapted to discharge given quantities of its contents into the water-reservoir during the filling of said reservoir and the latter being adapted when full, or nearly so, to discharge the entire quantity of the mixture of water and chemicals into the sewer-conduit itself with sufficient force or head to carry it along a reasonable distance.

Any of the well-known disinfecting agents may be used, my disinfecting-tank being adapted to discharge chemicals in the form of powder or crystals, as well as those in liquid form. The apparatus preferably is placed under ground in an excavation inclosed by walls of cement or masonry and which communicates with the sewer and the upper surface of the ground.

In sewers or drains of large capacity it will be found advantageous to place duplications of the apparatus at intervals along the system in order to insure every part of the conduit being reached by the disinfectant and the noxious qualities of the sewage completely eliminated.

My invention also contemplates a provision for the convenient recharging of the disinfectant vessel from the surface of the street or ground, or, if preferred, the disinfectant vessel as a whole may be entirely removed when empty and one newly charged substituted therefor.

In the accompanying drawings, Figure 1 is a sectional view, partly in elevation, illustrating my complete invention. Fig. 2 is a sectional view of a portable vessel adapted to hold a suitable disinfecting material. Fig. 3 is a sectional view on line $x$ $x$ of Fig. 2. Fig. 4 is a detail of a float, and Fig. 5 is a detail of a pawl-and-ratchet gearing.

Referring to the drawings by letter, A represents an underground sewer-conduit having a branch pipe $a$ opening into a basin or funnel-like depression B in the walls of the excavation B'. As shown, this excavation communicates with the upper surface of the ground and is provided with the cover $b$.

Supported by the U-shaped bracket C is a vessel D, having an opening $d$ at the top and a discharge-spout $d'$ at the bottom, the said bottom being closed by a rotatable disk $d^2$, having one or more pockets or recesses $d^3$ therein. Disk $d^2$ is carried by a shaft $d^4$, having its bearings in the walls of the vessel D. One end of the said shaft extends somewhat beyond one of said walls and has a ratchet-wheel $e$ tightly mounted thereon and a pinion $e'$ loosely mounted thereon. A pawl $g$, carried by the pinion, engages the teeth of the ratchet-wheel.

Mounted in guides $m$ $m$ are the rods $n$ $n$, attached to a float P, which preferably is a hollow sealed box of light metal. A vertical rack-bar R, also attached to said box, engages the teeth of pinion $e'$.

F is a tilting reservoir or tank pivoted upon a pair of laterally-projecting studs $f$, mounted in bearings $f'$. The reservoir is triangular or wedge-shaped, or, in other words, the bottom thereof is sloped in such manner as to throw the center of gravity to one side of a middle line. The studs are so located that normally the reservoir will maintain an upright position supported by the studs $f$ and a stop $f^2$; but when filled with water beyond a certain level the center of gravity will be shifted to the other side of the pivotal point and the tank will tilt and discharge its contents into the basin or funnel-like depression B aforesaid.

A pipe S, leading from a city main or other water-supply, leads into the excavation B' and is adapted to drip, preferably very slowly, into the tank F.

The operation is as follows: The float P, projecting into the tank F, will be carried upwardly as water in said tank rises and will transmit rotary motion to the disk $d^2$ through the devices above described. This obviously will carry each of the pockets $d^3$ into contact with the disinfecting material, fill the same, and cause them to be discharged successively into the tank F by way of the spout $d^4$. Literally I give the reservoir a "layer" of water, then a charge of disinfectant, another layer of water, and another charge of disinfectant, and so on, this being a most effective method of mixing the two elements. The pockets $d^3$ of course may be of any desired number and any desired capacity, these points being determined by the capacity of the reservoir and the required strength of the mixture. When filled, the tank will tilt suddenly, and its contents being thrown with considerable force against the walls of the basin B will insure a still more intimate mixture of the water and the chemicals, and then gaining headway as it passes down the incline of pipe $a$ it will both flush and purify the conduit A. The tank having become entirely emptied, its center of gravity will again be shifted and its normal position restored. There then being nothing to support the float, it will descend by gravity, rotating the pinion $e'$ from right to left and slipping the pawl $g$ over the teeth of the wheel $e$ without turning the latter until it rests upon the bottom of tank F. No disinfectant therefore will be discharged during this downward movement of the float. Should the tank be inclined to stick and remain in the tilted position, the descending float will force it back into place. It will be observed that the tank D is located within easy access of the surface of the ground, so that to recharge the same it will only be necessary to raise the cover $b$ and remove cap $d$ and make a pipe or hose connection with a suitable supply-tank above ground. In practice I contemplate the use of wheeled vehicles having storage-tanks of large capacity for this purpose. Obviously the vessel D may be slipped off its supporting-bracket and removed altogether without disturbing the tank or reservoir F or impairing the efficiency of the latter as a flushing-tank in the least.

Should it be desired at any time to cut off the supply of disinfectant without removing the vessel D entirely, the float may be raised until the hole $w$ in the rod $n$ is in alinement with the hole $w'$ in the guide $m$ and the pin $w^2$ used to lock the parts together. This position will also be the most convenient for transportation.

Having described my invention, I claim—

The combination of a tank or reservoir, a source of water-supply therefor, the said tank or reservoir being adapted to automatically discharge its contents when filled into a sewer or drain, a vessel containing a suitable disinfecting agent, a movable body closing the outlet from said vessel, a plurality of recesses or pockets of definite capacity in said body, and means controlled by the rise of water in said tank whereby said pockets or recesses are successively presented to the said outlet and then presented to the tank or reservoir, whereby a plurality of measured charges of the disinfecting agent may be emptied into the said tank during a single filling of the same.

In witness whereof I subscribe my signature in presence of two witnesses.

JARED E. LEWIS.

Witnesses:
FRANCIS C. ADLER,
BESSIE D. RHODES.